(12) United States Patent
Feng et al.

(10) Patent No.: US 8,719,448 B2
(45) Date of Patent: May 6, 2014

(54) ROUTE DETERMINATION METHOD AND DEVICE

(75) Inventors: Wei Feng, Shenzhen (CN); Zhihong Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 141 days.

(21) Appl. No.: 13/394,374

(22) PCT Filed: Jun. 29, 2010

(86) PCT No.: PCT/CN2010/074726
§ 371 (c)(1),
(2), (4) Date: Mar. 6, 2012

(87) PCT Pub. No.: WO2011/026374
PCT Pub. Date: Mar. 10, 2011

(65) Prior Publication Data
US 2012/0166674 A1 Jun. 28, 2012

(30) Foreign Application Priority Data
Sep. 7, 2009 (CN) .......................... 2009 1 0161960

(51) Int. Cl.
*G06F 15/173* (2006.01)

(52) U.S. Cl.
USPC ........... 709/241; 709/238; 709/239; 709/240; 709/242

(58) Field of Classification Search
CPC ......... H04Q 3/66; H04L 45/123; H04L 45/62
USPC ................................................ 709/238–242
See application file for complete search history.

(56) References Cited

U.S. PATENT DOCUMENTS

| 6,829,347 | B1 | 12/2004 | Odiaka |
| 2001/0043676 | A1* | 11/2001 | Vander Meiden et al. . 379/32.02 |
| 2004/0153492 | A1 | 8/2004 | Cao et al. |

FOREIGN PATENT DOCUMENTS

| CN | 101052235 A | 10/2007 |
| CN | 101227248 A | 7/2008 |
| CN | 101321134 A | 12/2008 |
| CN | 101646108 A | 2/2010 |

OTHER PUBLICATIONS

NPL, "SPARK: A Smart Parametric Online RWA Algorithm", Palmieri et al., IEEE Journal of Communications and Networks, vol. 9, No. 4, Dec. 2007.*
International Search Report for PCT/CN2010/074726, English translation attached to original, Both Completed by the Chinese Patent Office on Sep. 16, 2010, All together 6 Pages.

* cited by examiner

*Primary Examiner* — Wing F Chan
*Assistant Examiner* — Padma Mundur
(74) *Attorney, Agent, or Firm* — Brooks Kushman P.C.

(57) ABSTRACT

A method and device for determining a route including: presetting the number N of routes, performing a K shortest paths algorithm after a route query request is received, calculating the routes by group according to the number N of the routes, whenever N routes are calculated, outputting the N calculated routes as a group, and assigning resources to the group of routes; and stopping calculating the routes if a route on which resource matching is successful is obtained from the group of routes, and using the route on which the resource matching is successful as the determined route; otherwise, performing the resource matching on the next group of output routes to determine a route; where N is a positive integer and 1<N<K.

14 Claims, 3 Drawing Sheets

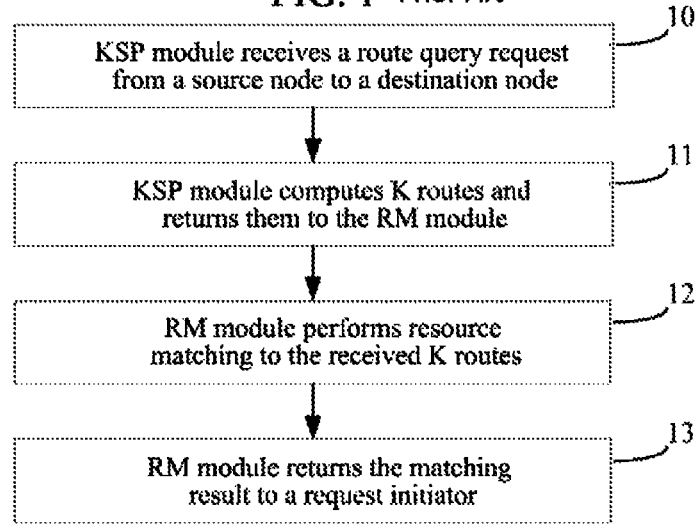
FIG. 1 Prior Art
FIG. 2 Prior Art
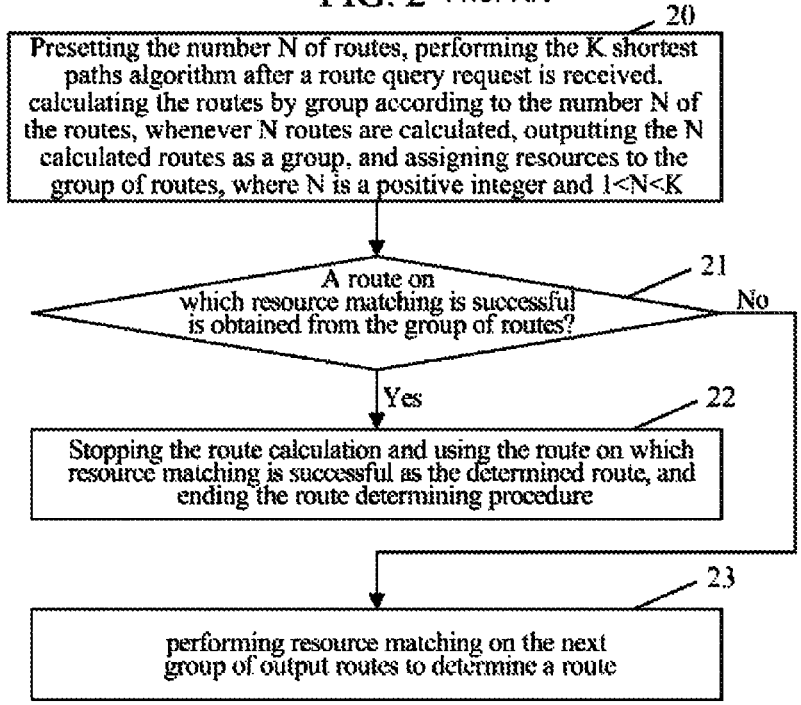
FIG. 3

ROUTE DETERMINATION METHOD AND DEVICE

CROSS-REFERENCE TO RELATED APPLICATION

This application is the U.S. national phase of PCT Appln. No. PCT/CN2010/074726 filed Jun. 29, 2010 which claims priority to Chinese Application No. 200910161960.5 filed Sep. 7, 2009, the disclosures of which are incorporated in their entirety by reference herein.

TECHNICAL FIELD

The present invention relates to a routing technology in the field of communication, and in particular, to a method and device for determining a route.

BACKGROUND OF THE RELATED ART

The automatic switched optical network (ASON) is an optical transmission technology with intelligent characteristics. It utilizes standard protocols, such as signaling, routing, automatic discovery, etc., to implement functions, such as routing automatic calculation, connection automatic setup, network source automatic discovery, etc., to improve the automatic control ability of the optical transmission network such that the optical transmission network has intelligent characteristics like the IP network. A route controller, which acts as a module in charge of routing automatic calculation, is an important component module of a control plane of the ASON, and is also an important embodiment of its intellectualization.

The route controller in the ASON usually obtains a shortest path using the traditional open shortest path first (OSPF) protocol. However, in some cases, it is not enough to provide only one path. For example, the resource matching problem may be involved in some applications. If the matching is unsuccessful, indicating that this path is obstructed, then routing calculation from a source node to a destination node will be failed. Therefore, in some applications of the ASON, the K shortest paths (KSP) algorithm is used to solve the resource matching problem. That is, K shortest alternative paths will be calculated by the route controller to provide a condition that the resource matching can determine a resource constrained shortest path among all the K alternative paths. Therefore, where K shortest alternative paths are required to be calculated, the KSP algorithm is an important function in the route controller.

As shown in FIG. 1, there are two processing modules in the route controller of the ASON, one being a resource matching (RM) module which mainly provides the resource matching function, the other being a KSP module configured to receive a route query request, calculate routes and send the calculated routes to the RM module, which processes the resource matching. The work procedure of the processing modules in the route controller of the ASON is shown in FIG. 2, and comprises the following steps. In step 10, the KSP module receives a route query request from a source node to a destination node. In step 11, the KSP module calculates the K routes and returns them to the RM module. In step 12, the RM module performs the resource matching on the K received routes. In step 13, the RM module returns the matching result to a query initiator. According to such a work mode, the KSP module stops calculation only if the K shortest alternative paths have been calculated completely, or there is no other alternative route available in the network even if the K shortest alternative paths have not been calculated yet completely. Then, the KSP module sends all the calculated paths to the RM module for resource matching.

At present there are many research literatures on the KSP algorithm, and the KSP algorithm used for calculating K routes is relatively mature. Whichever scheme the KSP algorithm uses, the time complexity of the whole KSP algorithm is directly proportional to the value of K. The value of K, which is a main parameter of the KSP algorithm, is preset. If the value of K is set to be too small, then the number of the obtained alternative routes is relatively small, and it is possible that a route meeting the resource matching requirement can not be found in the routes; if the value of K is set to be too large, then the KSP algorithm consumes longer time. It can be seen that there is contradiction between reduction of consumed time of the KSP algorithm and satisfaction of the resource matching requirement when the route is determined.

Content of the Invention

The present invention provides a method and device for determining a route so as to solve the problem that there is a there is contradiction between reduction of consumed time of the KSP algorithm and satisfaction of the resource matching requirement in the prior art.

In order to solve the above problem, the present invention provides the following technical scheme.

The present invention provides a method for determining a route comprising:

presetting the number N of routes, performing a K shortest paths algorithm after a route query request is received, calculating the routes by group according to the number N of the routes, whenever N routes are calculated, outputting the N calculated routes as a group, and assigning resources to the group of routes; and stopping calculating the routes if a route on which resource matching is successful is obtained from the group of routes, and using the route on which the resource matching is successful as the determined route; otherwise, performing the resource matching on the next group of output routes to determine a route;

where N is a positive integer and 1<N<K.

The method further comprises: determining whether all routes have been calculated completely, and stopping the K shortest paths calculation procedure when all routes have been calculated completely.

The method further comprises: determining whether all routes have been calculated and matched completely when the resource matching is unsuccessful, and terminating the route determining procedure when all routes have been calculated and matched completely.

The routes are calculated in an order of path quality from good to poor; and the resource matching is performed in an order of path quality from good to poor in the group of routes.

N is 2, 3, 4 or 5.

The present invention further provides a device for determining a route comprising:

a route calculation module configured to preset the number N of routes, perform a K shortest paths algorithm after a route query request is received, calculate the routes by group according to the number N of the routes, whenever N routes are calculated, output the N calculated routes as a group to a resource matching module, and perform resource matching on the group of routes; and the resource matching module configured to perform the resource matching on the group of received routes, if a route on which the resource matching is successful is obtained, use the route as the determined route and notify the route calculation module to stop calculating the routes; otherwise, perform the resource matching on the next group of received routes to determine a route;

where N is a positive integer and 1<N<K.

The route calculation module is further configured to determine whether all routes have been calculated completely, and stop the K shortest paths calculation procedure when all routes have been calculated completely.

The resource matching module is further configured to determine whether all routes have been calculated and matched completely when the resource matching is unsuccessful, and terminating the route determining procedure when all routes have been calculated and matched completely.

The route calculation module calculates the routes in an order of path quality from good to poor; and the resource matching module is further configured to perform the resource matching on the routes output by the route calculation module in an order of path quality from good to poor.

N is 2, 3, 4 or 5.

In the method and device in accordance with the present invention, when the K shortest paths algorithm is performed, after a group of routes the number of which is less than K are obtained, the resource matching is performed on these routes, while the K shortest paths algorithm is continuously performed. If there is a route on which resource matching is successful in the group of routes, then the K shortest paths algorithm can be terminated in advance. Since a suitable value of K can be set to ensure basically that success of the resource matching can be obtained in K alternative paths, the method and device in accordance with the present invention, on one hand, can ensure that the route on which resource matching is successful can be obtained through the K shortest paths algorithm, and on the other hand, can assist the system in exiting the K shortest paths calculation in advance, which is helpful to solve the contradiction between reduction of consumed time of the KSP algorithm and satisfaction of the resource matching requirement, thereby improving the efficiency of determining a route.

BRIEF DESCRIPTION OF DRAWINGS

FIG. 1 is a block diagram of an route controller of the ASON in the prior art;

FIG. 2 is a flow chart of operation of processing modules in a route controller of the ASON;

FIG. 3 is a flow chart of a method for determining a route according to the present invention;

PREFERRED EMBODIMENTS OF THE PRESENT INVENTION

The technical scheme of embodiments of the present invention will be described in detail in conjunction with the accompanying drawings hereinafter. The figures are used to assist in understanding the technical scheme of the embodiments, which is not limited to the form shown in the figures in implementation.

In the present invention, when the K shortest paths algorithm is performed to calculate the alternative routes, a group of routes the number of which is less than K are calculated and output, then resource matching is performed on these routes, if a route on which resource matching is successful is obtained from the routes, then the route is used as the determined route; otherwise, the resource matching is performed continuously on other routes obtained by the K shortest paths algorithm to determine a route. The method can be applied to an ASON system and performed when a route controller receives a route query request, or the method can be applied to other similar application cases required to determine the route. The characteristics of these application cases include calculating the routes and verifying the routes, for example, when resource matching is implemented, the routes are calculated while the calculated routes are verified to improve the efficiency of route determining work.

FIG. 3 is a flow chart of a method for determining a route in accordance with the present invention. The method includes the following steps.

In step 20, the number N of routes is preset, the K shortest paths algorithm is performed after a route query request is received, the routes are calculated by group according to the number N of the routes, whenever N routes are calculated, the N calculated routes are output as a group, and resource matching is performed on the group of routes, where N is a positive integer and 1<N<K.

In step 21, it is determined whether a route on which resource matching is successful is obtained from the group of routes, and if yes, step 22 is executed; if not, step 23 is executed.

In step 22, the route calculation is stopped and the route on which resource matching is successful is used as the determined route, and the route determining procedure ends.

In step 23, the resource matching is performed on the next group of output routes to determine a route.

The method for determining a route in accordance with the present invention is further described in detail in conjunction with the specific embodiments hereinafter.

Figure 4:
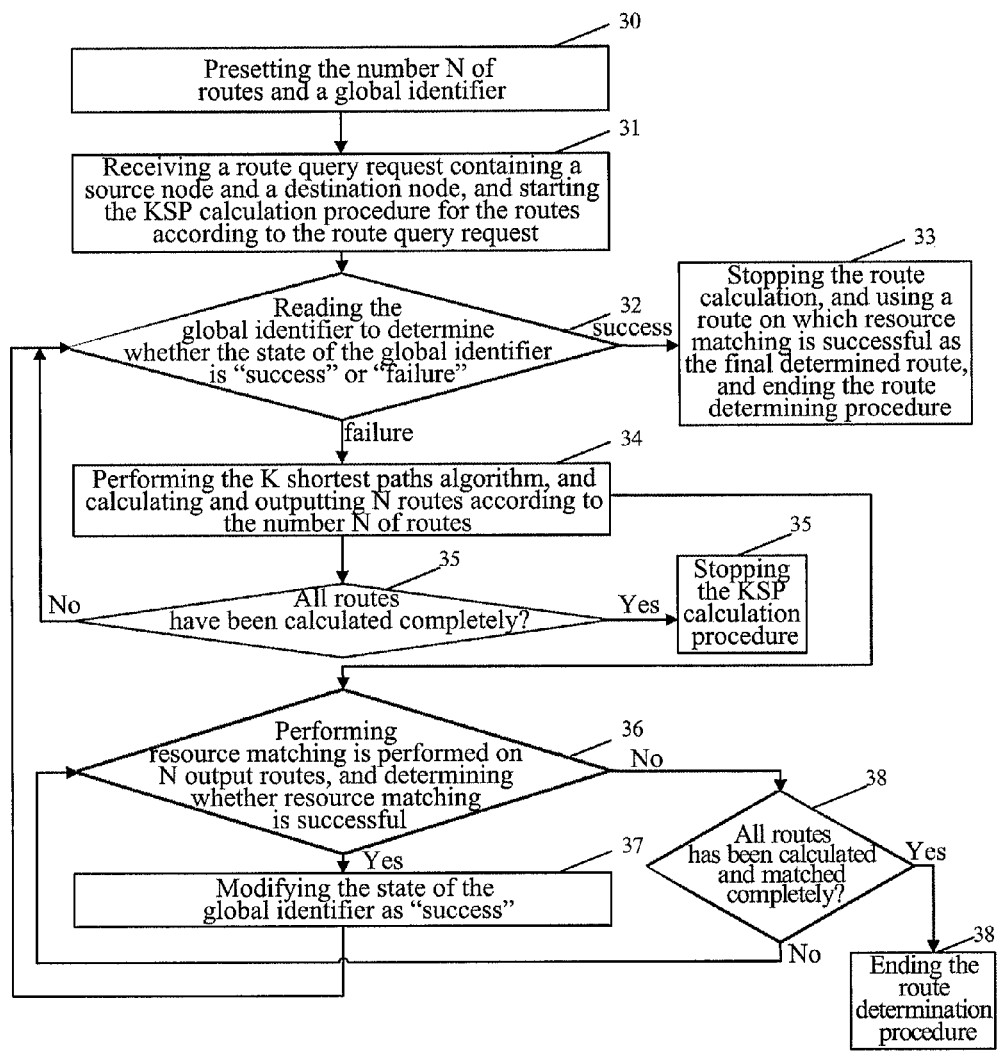
FIG. 4 is a flow chart of a method for determining a route according to an embodiment of the present invention.

In the present embodiment, a specific procedure of a method for determining a route by using the KSP algorithm is shown in FIG. 4 and comprises the following steps.

In step 30, the number N of routes and a global identifier are preset; the number N of the routes is used to identify the number of routes calculated and output whenever the K shortest paths algorithm is performed, where N is a positive integer and 1<N<K; the global identifier is used to identify whether the resource matching is successful, and the initial state of the global identifier is set as "failure".

In this step, the number N of the routes can be modified according to actual situations of the network. The initial state of the global identifier is set as "failure", and after the resource matching is performed on the routes successfully, the state of global identifier is modified as "success". For example, the global identifier can be represented by a binary code: when it is 0, it is shown that the resource matching is failed, and when it is 1, it is shown that the resource matching is successful. The initial value of the global identifier is set to be 0, and after the resource matching is performed on the route successfully, the value of the global identifier is modified as 1.

In step 31, a route query request containing a source node and a destination node is received. The KSP calculation procedure for the routes commences according to the route query request.

In step 32, the global identifier is read to determine whether the state of the global identifier is "success" or "failure", and if it is "success", step 33 is executed; and if it is "failure", step 34 is executed.

In step 33, the route calculation is stopped, and a route on which resource matching is successful is used as the final determined route, and the route determining procedure ends.

In step 34, the K shortest paths algorithm is performed, and after N routes are calculated and output according to the number N of routes, step 35 and step 36 are performed respectively.

In step 35, it is determined whether all routes have been calculated completely, and if yes, the KSP calculation procedure is stopped; and if not, the procedure returns to step 32.

In step 36, the resource matching is performed on the N output routes, and it is determined whether the resource matching is successful, and if yes, step 37 is executed, and if not, step 38 is executed.

In step 37, after the state of the global identifier is modified as "success", the procedure returns to step 32.

In step 38, whether all routes has been calculated and matched completely is determined, if yes, the route determining procedure ends; and if not, the procedure returns to step 36.

Step 32 and step 36 are processed concurrently.

According to the characteristic of the KSP algorithm, after the procedure proceeds to step 35 and returns to step 32, the procedure proceeds to step 34 to continue to perform the same K shortest paths algorithm as that performed previously in step 34, and N routes are calculated and output again according to the N number of the routes, and are different from the routes previously obtained through the K shortest paths algorithm.

After the procedure proceeds to step 38 and returns to step 36, the resource matching is performed on the next group of output routes.

After the procedure proceeds to step 34, the process of performing the resource matching is in a waiting state until another group of N routes are calculated and output. It can be seen that if the number of routes is set to be a smaller value, the waiting time for resource matching process is shorter, which is helpful to improve the efficiency of route query. However, since the ASON system itself has the requirement for providing route protection, the number of preferable preset routes is greater than 1. Generally speaking, the KSP calculation time for calculating 2 routes can be decreased to be below 1/10 of the time for calculating 10 routes; and the KSP calculation time for calculating 5 routes can be decreased to be below 1/2 of the time for calculating 10 routes. Therefore, the preferable preset number of routes is 2-5.

Figure 5:
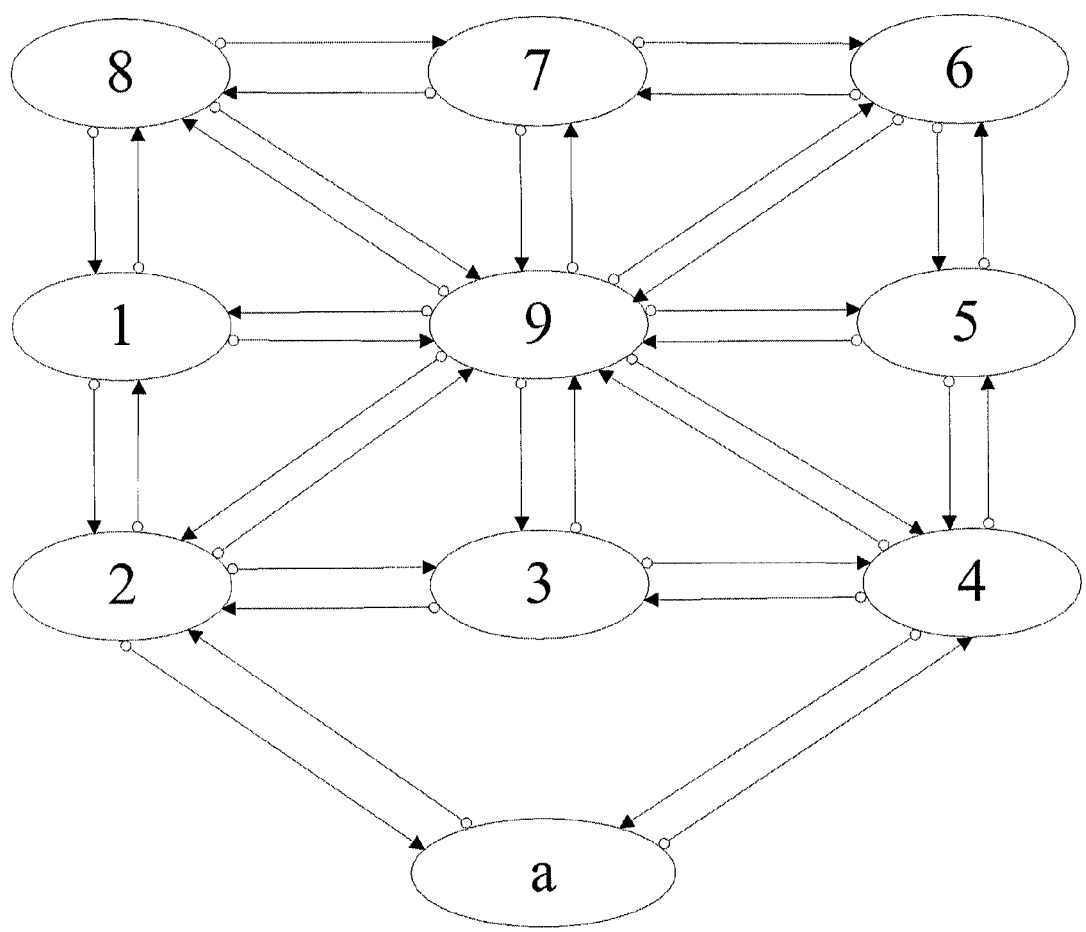
FIG. 5 is a network topological diagram according to an embodiment of the present invention.

The method in accordance with the present embodiment is further described in detail by taking a network topological diagram shown in FIG. 5 as an example hereinafter. In FIG. 5, one node is marked out in each ellipse, and according to data used in the experiment, link overhead is marked out in the middle of an arrow, and a port number of a node is marked out near the end of the ellipse. The value of K of the system is preset to be 10 to ensure basically that the resource matching is performed successfully on K alternative paths. Then, if the K alternative routes are calculated and matched according to the method of the prior art, it will take about 172 ms to establish services from node 1 to node 3 in the experiment. If the value of K of the system is preset to be 10 and the number of routes is preset to be 2 according to the method in accordance with the present embodiment, after the K shortest paths algorithm is performed and after 2 alternative routes are calculated, the resource matching is performed on the 2 alternative routes while the K shortest paths algorithm is performed continuously. It only takes 16 ms if the matching is successful. Of course, in some real systems, the resource matching may not be successful on the first group of output routes, and in this case, after the resource matching is performed on 2 routes in the first group, if 2 routes in the second group are also calculated, then the resource matching is continuously performed on the second group of routes. In the same way, the routes obtained through the K shortest paths algorithm with K=10 are output by group of 2 routes and the resource matching is performed. In the worst case, the resource matching is not successful until the resource matching is performed on the ninth or tenth route, and at this point, the efficiency is basically same as that in the prior art. This is a special case, while the resource matching has been successful before this in most usual systems.

Based on the method described above, the present invention provides a device for determining a route. The device in accordance with the present embodiment will be described hereinafter. The device in accordance with the present embodiment can be implemented using software, hardware or both. The structure of the device is divided according to function modules hereinafter. In an implementation, each module can be used as a device, or as a component part of the same device. It may be understood by those skilled in the art that all or some of the steps in the described methods in accordance with the embodiments can be implemented by related hardware instructed by programs which may be stored in computer readable storage mediums, such as a ROM/RAM, a magnetic disk or a CD-ROM, etc.

Figure 6:
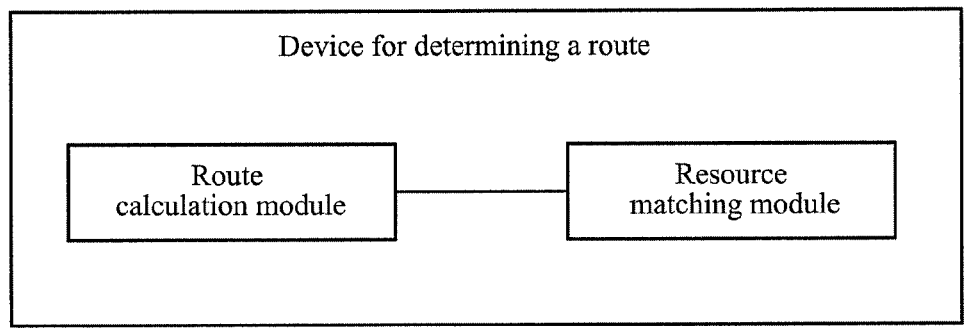
FIG. 6 is a block diagram of a device for determining a route according to an embodiment of the present invention.

The structure of a device for determining a route in accordance with the present embodiment is shown in FIG. 6 and comprises a route calculation module and a resource matching module.

The route calculation module is configured to preset the number N of routes, perform a K shortest paths algorithm after a route query request is received, calculate the routes by group according to the number N of the routes, whenever N routes are calculated, output the N calculated routes as a group to the resource matching module, and perform resource matching on the group of routes.

The resource matching module is configured to perform the resource matching on the group of received routes, if a route on which the resource matching is successful is obtained, use the route as the determined route and notify the route calculation module to stop calculating the routes; if the route on which the resource matching is successful is not obtained, perform the resource matching on the next group of received routes to determine a route.

The route calculation module is further configured to determine whether all routes have been calculated completely, and stop the K shortest paths calculation procedure when all routes have been calculated completely.

The resource matching module is further configured to determine whether all routes have been calculated and matched completely when the resource matching is unsuccessful, and terminating the route determining procedure when all routes have been calculated and matched completely.

The route calculation module calculates the routes in an order of path quality from good to poor; and the resource matching module is further configured to perform the resource matching on the routes output by the route calculation module in an order of path quality from good to poor.

N preferably is 2, 3, 4 or 5.

In the method and device in accordance with the present invention, when the K shortest paths algorithm is performed, after a group of routes the number of which is less than K are obtained, the resource matching is performed on these routes, while the K shortest paths algorithm is continuously performed. If there is a route on which resource matching is successful in the group of routes, then the K shortest paths algorithm can be terminated in advance. The efficiency is improved notably compared with the method in the prior art for assigning resources after K routes are calculated. If the route on which resource matching is successful is not found in the first group of routes, then it will be searched in the second group of calculated routes. In the real system, the route on which resource matching is successful is usually found before all the K routes are calculated. A suitable value of K can be set to ensure basically that success of the resource matching can be obtained in K alternative paths.

Since the time required to perform resource matching and output and receive the routes by group is much less than the time required for the K shortest paths algorithm, and the method and device in accordance with the present invention, on one hand, can ensure that the route on which resource matching is successful can be obtained through the K shortest paths algorithm, and on the other hand, can assist the system in exiting the K shortest paths calculation in advance, which is helpful to solve the contradiction between reduction of consumed time of the KSP algorithm and satisfaction of the resource matching requirement, thereby improving the efficiency of determining a route.

The above description is only the preferred embodiments of the present invention and is not intended to limit the protection scope of the present invention.

What we claim is:

1. A method for determining a route, comprising following steps performed by a route controller in an automatic switch optical network:

Presetting the number N of routes,
   performing a K shortest paths algorithm after a route query request is received,
   calculating the routes by group according to the number N of the routes, whenever N routes are calculated, outputting the N calculated routes as a group and assigning resources to the group of routes; and
   stopping calculating the routes if a route on which resource matching is successful is obtained from the group of routes, and using the route on which the resource matching is successful as the determined route; otherwise, performing the resource matching on the next group of output routes to determine a route;
   where N is a positive integer and 1<N<K.

2. The method according to claim 1, further comprising:
   determining whether all routes have been calculated completely, and stopping the K shortest paths calculation procedure when all routes have been calculated completely.

3. The method according to claim 1, further comprising:
   determining whether all routes have been calculated and matched completely when the resource matching is unsuccessful, and terminating the route determining procedure when all routes have been calculated and matched completely.

4. The method according to claim 1, wherein the routes are calculated in an order of path quality from good to poor; and
   the resource matching is performed in an order of path quality from good to poor in the group of routes.

5. The method according to claim 4, wherein N is 2, 3, 4 or 5.

6. A router controller in an automatic switch optical network, comprising a processor executing following modules:
   a route calculation module, configured to preset the number N of routes, perform a K shortest paths algorithm after a route query request is received, calculate the routes by group according to the number N of the routes, whenever N routes are calculated, output the N calculated routes as a group to a resource matching module to perform resource matching on the group of routes; and
   the resource matching module, configured to perform the resource matching on the group of received routes, if a route on which the resource matching is successful is obtained, use the route as the determined route and notify the route calculation module to stop calculating the routes; otherwise, perform the resource matching on the next group of received routes to determine a route;
   where N is a positive integer and 1<N<K.

7. The device according to claim 6, wherein the route calculation module is further configured to determine whether all routes have been calculated completely, and stop the K shortest paths calculation procedure when all routes have been calculated completely.

8. The device according to claim 6, wherein the resource matching module is further configured to determine whether all routes have been calculated and matched completely when the resource matching is unsuccessful, and terminating the route determining procedure when all routes have been calculated and matched completely.

9. The device according to claim 6, wherein the route calculation module calculates the routes in an order of path quality from good to poor; and
   the resource matching module is further configured to perform the resource matching on the routes output by the route calculation module in an order of path quality from good to poor.

10. The device according to claim 9, wherein N is 2, 3, 4 or 5.

11. The method according to claim 2, wherein the routes are calculated in an order of path quality from good to poor; and
    the resource matching is performed in an order of path quality from good to poor in the group of routes.

12. The method according to claim 3, wherein the routes are calculated in an order of path quality from good to poor; and
    the resource matching is performed in an order of path quality from good to poor in the group of routes.

13. The device according to claim 7, wherein the route calculation module calculates the routes in an order of path quality from good to poor; and
    the resource matching module is further configured to perform the resource matching on the routes output by the route calculation module in an order of path quality from good to poor.

14. The device according to claim 8, wherein the route calculation module calculates the routes in an order of path quality from good to poor; and
    the resource matching module is further configured to perform the resource matching on the routes output by the route calculation module in an order of path quality from good to poor.

* * * * *